J. W. HILDRETH.
FLY TRAP.
APPLICATION FILED MAY 10, 1911.

1,020,500.

Patented Mar. 19, 1912.

WITNESSES
C. M. Walker
J. T. Walker

INVENTOR
J. W. Hildreth
by _____ Attorney

UNITED STATES PATENT OFFICE.

JAMES W. HILDRETH, OF MARION, OHIO.

FLY-TRAP.

1,020,500. Specification of Letters Patent. Patented Mar. 19, 1912.

Application filed May 10, 1911. Serial No. 626,140.

*To all whom it may concern:*

Be it known that I, JAMES W. HILDRETH, citizen of the United States, residing at Marion, in the county of Marion and State of Ohio, have invented certain new and useful Improvements in Fly-Traps, of which the following is a specification.

This invention relates to fly traps.

One object of the invention is to provide a fly trap particularly adapted for application to window, door or other screens so that flies crawling up the screen will enter the cage and be trapped therein.

Another object resides in the provision of a portable fly trap that may be easily and quickly attached to or removed from screen doors, windows, or the like.

With the above and other objects in view, the present invention consists in the construction and arrangement of parts hereinafter more fully described, illustrated in the accompanying drawings and particularly pointed out in the appended claim, it being understood that changes may be made in the form, proportion, size and minor details without departing from the spirit or sacrificing any of the advantages of the invention.

Figure 1:
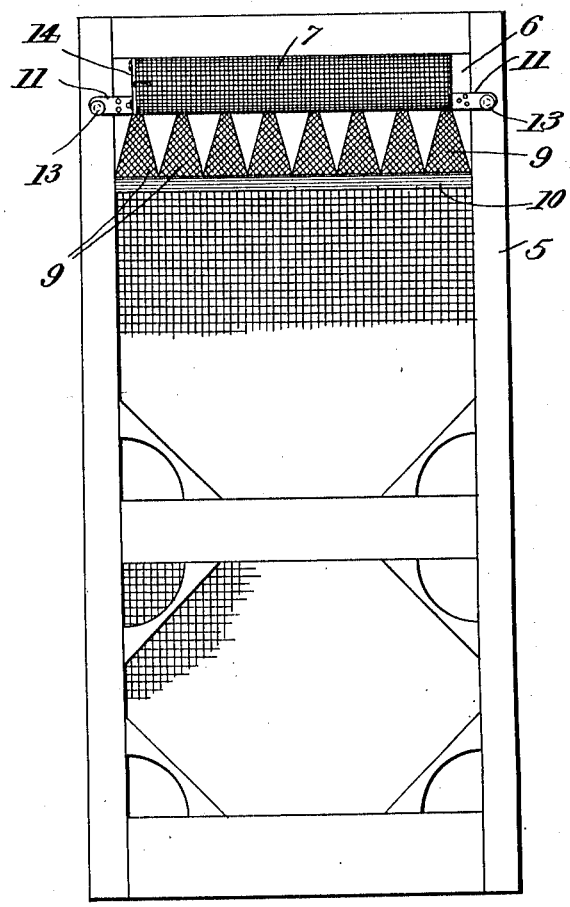
Figure 2:
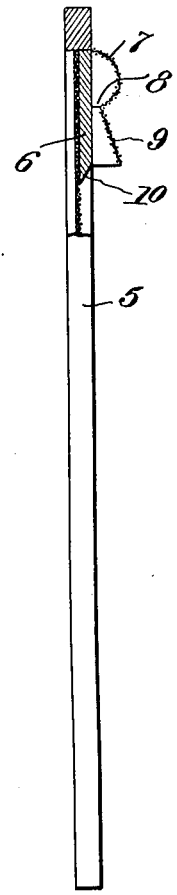
Figure 3:
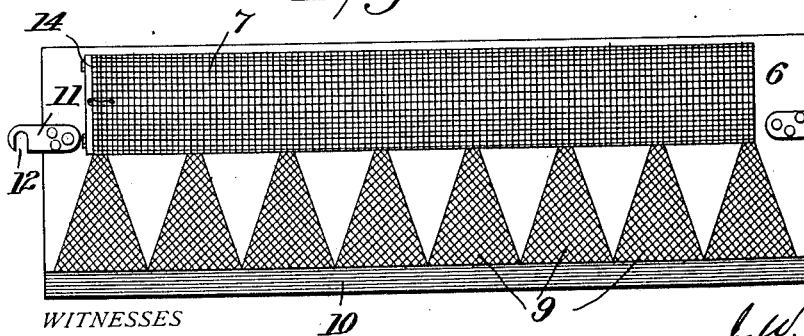
Figure 4:
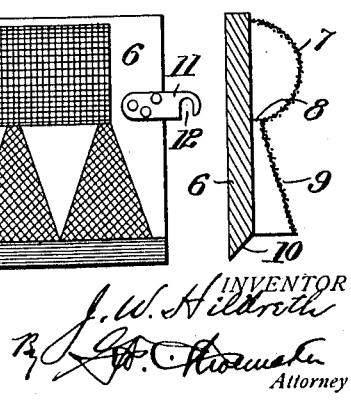

In the drawings:—Figure 1 is a front elevation of a door showing my invention applied thereto. Fig. 2 is a side view of a door partly in section, illustrating my invention applied thereto. Fig. 3 is a front view of my portable trap detached from the screen. Fig. 4 is a cross sectional view on the line *a—a* of Fig. 3.

Referring now more particularly to the accompanying drawings, it will be understood that while my improved trap is applied to a door 5, that the trap may be applied to a window or any other type of screen.

The character 6 indicates a board or back, to the front of which is secured at the upper edge thereof a semi-cylindrical shaped cage 7 which is preferably formed of wire gauze. Along the lower edge of the cage 7 is a plurality of openings 8 and at these openings 8 are disposed the minor ends of the semi-conical shaped passages 9, composed preferably of wire mesh and whose major ends terminate close to the inner side of the beveled edge 10 of the board 6. Brackets 11 are secured to the ends of the board 6 and at their outer ends have notches 12 adapted to fit over the projections 13 on the frame of the door or other screen and thus provide for a firm support of my improved trap at the top of the door, window or the like. Flies or other insects usually crawl upwardly and by virtue of the beveled edge 10 of the board 6 they proceed into the passages 9, finally entering through the openings 8 into the cage 7 where they are trapped and can not again enter the inside of the room.

When desired, the trap may be readily disconnected from the screen and the trap taken to the outside of the room and the door 14 at the end of the cage 7 opened to permit the flies to escape. If preferred, the door 14 need not be opened but the flies confined in the cage 7 and scalded or otherwise killed. If desired, and in uncertain conditions it may be preferable to support the trap on the outside of the door for the purpose of catching the flies before they enter the room, the flies usually crawling upward to enter or leave a room.

What is claimed is:—

A fly trap comprising a non-transparent, rigid back having its forward edge beveled, a cage secured to the back member with the forward edge of the cage terminating substantially mid-way of the front and rear of the back member, and semi-conical shaped passages leading from said beveled edge to the back member and into the forward edge of said cage and communicating with the latter with said back member forming a part of each of said passages and a surface on which the flies may crawl from said beveled edge in a direct course to said cage, the cage and said passages being confined within the edges of said back member.

In testimony whereof I affix my signature in presence of two witnesses.

JAMES W. HILDRETH.

Witnesses:
   VERTIE SMILEY,
   S. R. RAUHAUSER.

---

Copies of this patent may be obtained for five cents each, by addressing the "Commissioner of Patents, Washington, D. C."